April 28, 1970      D. C. DUGGAN      3,508,893
COOLING AND LUBRICATING MEANS FOR GLASS FORMING PLUNGERS
Filed Sept. 15, 1967
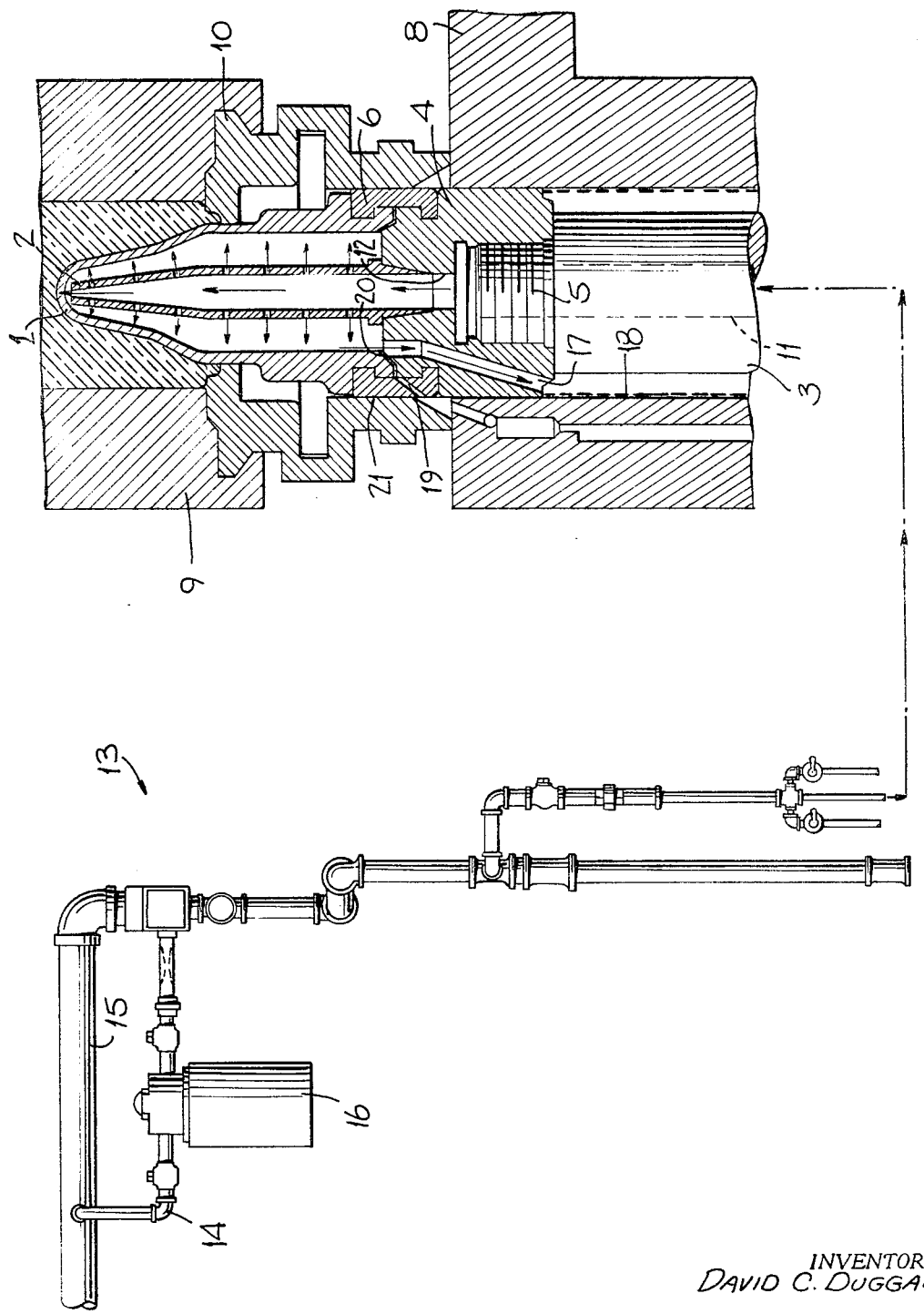
INVENTOR.
DAVID C. DUGGAN
BY Norman N. Holland
ATTORNEY

United States Patent Office 3,508,893
Patented Apr. 28, 1970

3,508,893
COOLING AND LUBRICATING MEANS FOR
GLASS FORMING PLUNGERS
David C. Duggan, Lancaster, Ohio, assignor to Anchor
Hocking Glass Corporation, Lancaster, Ohio, a corporation of Delaware
Filed Sept. 15, 1967, Ser. No. 668,049
Int. Cl. C03b *39/00;* F16n *1/00, 39/08*
U.S. Cl. 65—24                                    8 Claims

ABSTRACT OF THE DISCLOSURE

A cooling and lubricating method and system for the plunger cylinders of I.S. type glass forming machines wherein a micro-fog of fine oil-water mist generator is included in the plunger cooling system. Cooling air including the lubricating mist is directed into the hollow interior of the glass forming plunger spraying the inner surfaces of the plunger and for thereafter flowing conduits in the plunger assembly and lubricating the bearing surfaces including the surrounding bushings. The mist is also directed to the surface of the plunger split ring or mounting clamp through conduits provided therein.

Background of the invention

The present invention relates to the lubrication of glass forming machines and more particularly to the cooling and lubrication of the molding plunger assemblies with a system using micro-fog or lubricating mist.

In I.S. or similar glass forming machinery now widely used by the glass industry, a gob of molten glass is fed to a mold and pressed into shape by the insertion of a plunger which forces it to conform to the shape of the mold walls. This operation is necessarily carried on in a high temperature environment since the molten glass gob is worked on immediately after being fed from the glass furnace.

A serious problem which has been encountered in this operation is the presence of minute impurities in the molded articles which are known as black specks. Investigation has indicated that the black specks were derived from certain of the plunger assembly elements such as the bushing interfaces and the plunger split clamp rings which lock the plunger on its operating rod. The surfaces of these elements were found to be excessively worn and insufficiently lubricated by the lubricating systems utilizing liquid lubrication feed means or swabbing.

Summary of the invention

The present invention overcomes this problem by providing an improved lubricating method and system for the plunger cylinders which substantially eliminates the previously occurring wear between the plunger elements and the surrounding bushings.

This is accomplished by directing a micro-fog of oil and water particles into a plunger air cooling system resulting in improved cooling and lubrication of the plunger and of the sliding surfaces of the plunger assembly.

It is therefore an object of the present invention to provide an improved method and means for lubricating I.S. or similar glass forming machinery.

It is another object of the present invention to provide an improved method and means for lubricating the forming plunger assemblies of such machines which is readily adaptable for use in existing equipment.

It is another object of the present invention to provide an improved lubricating system for glass molding machines which eliminates impurities such as black specks on the finished glassware.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawing forming a part of the specification.

The drawing is an elevational view of a cooling air manifold for the plungers of an I.S. glass forming machine incorporating the source of lubricant in accordance with the invention and as coupled to a preferred embodiment of a glass forming plunger as illustrated in section.

Description of the preferred embodiment

The improved plunger and surrounding structure is shown at the right-hand side of the figure. The shaping plunger 1 is hollow and has a cooling tube 2 extending axially within its interior. The cooling tube 2 is perforated to permit the passage of cooling air or other fluids into the interior of the plunger 1. The plunger 1 is mounted on an operating plunger rod 3 by means of an adapter 4 which is screwed onto a threaded stud 5 on the upper portion of the plunger rod 3. The plunger 1 is held on the adapter 4 by means of a split clamping ring 6.

The plunger assembly operates within a hollow support cylinder 8 for moving the plunger 1 into the mold 9 through the mold neck ring 10. The plunger rod 3 and adapter 4 are provided with mating bores 11 and 12 which communicate with the interior of the cooling tube 2. The continuous passage formed thereby permits the introduction of air or other fluids into the interior of the plunger 1 to remove heat transferred to the plunger 1 during the pressing of the molten glass gob in the mold 9.

At the left-hand side of the drawing, an air manifold 13 is shown which supplies cooling air to the interiors of the I.S. machine plungers through the passage including bore 11 described above. A by-pass conduit 14 in the air line 15 is coupled to a source of a micro-fog lubricant 16. The lubricant contained in the cylinder 16 produces a mist or fog of fine water and oil particles which is carried by the cooling air through the manifold 13 into the interior of the plungers 1. The unit 16 may be any of a number of commercially obtained micromist products which include a lubricant reservoir and which by an atomizing action produce the lubricating mist in air or other gas as it passes through the unit under pressure. The lubricants may be liquid petrolium or synthetic lubricating oils as supplied for the micro-mist generators such as an E. F. Houghton #620 synthetic oil mixture comprising about 40 percent water and 60 percent non-inflammable hydraulic fluid.

As the air passes through the conduit 14 it picks up a fine mist of particles of the oil-water mixture. The cooling air including the lubricating mist passes up through the plunger rod bore 11 and out through the perforated tube 2 spraying the inner surface of the plunger cylinder 1. This flow acts initially to cool the plunger cylinder 1. The cooling and lubricating mixture then passes downwardly through one or more conduits 17 in the plunger adapter 4 so that the mist engages the bearing surfaces 18 on the interface between the ring 6, adapter 4, and cylinder 8. This mist forms a lubricating coating on the interior cylinder surface 18.

A further feature of the present invention includes the provision of one or more conduits 19 in the plunger split ring clamp 6. A portion of the lubricating mist in the hollow plunger passes downwardly through the joint 20 between the plunger 1 and the plunger adapter 4 to conduits 19 and lubricates the outer surface 21 of the ring clamp 6.

The important bearing surfaces of the plunger assembly are thus directly lubricated by the mist. Tests of the machines lubricated in this manner have indicated that the improved lubrication system significantly reduces wear and virtually eliminates the occurrence of impurities such as black specks on the finished glassware.

It is thus seen that in addition to providing an improved lubricating system permitting controlled lubrication of the plunger cylinder, this invention provides a lubricating system easily applied to plungers of the type described by being inserted in the plunger air cooling system in the manner described.

The improved lubricating system is also particularly useful on glass forming machines such as the I.S. machines which have several forming stations as the micro-mist generator may be coupled simultaneously into all of the plunger cooling lines as well as to other portions of the machine which must be lubricated. The mist may be applied by a newly added conduit or it may be included as described above in existing air distributing systems. It thus is clear that the micro-mist may be included in any one or all of the existing air cooling lines for carrying lubrication where needed and particularly into portions of the machine which may be enclosed and thus not readily accessible to either the regular or supplemental lubrication.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A glass forming machine comprising the combination of a press mold plunger having a cavity therein, a hollow support rod, a hollow cylinder slidably mounting said rod, an adaptor for mounting the plunger on the rod, said adaptor having conduits therein connecting the plunger cavity with the surface of said cylinder, means for introducing cooling air into said cavity through said hollow rod, and means for adding a fine mist of lubricating fluid and water particles to said air for cooling the plunger and for passing through the adaptor conduits for lubricating the inner surface of the cylinder.

2. In a glass mounting machine of the type having a hollow press mold plunger and mounted by an adapter on a hollow rod that operates in a cylinder said adapter provided with a conduit therein connecting the plunger interior with the inner surface of the cylinder and a bore for passing cooling air through said rod to the plunger interior, the improvement which comprises means for introducing a fine mist comprising a lubricant into the cooling air for further cooling the plunger interior and for lubricating the interface between said plunger and cylinder upon flowing out through said adapter conduit.

3. A glass molding machine as claimed in claim 2 wherein the fine mist comprises particles of oil and water.

4. A glass molding machine as claimed in claim 2 wherein the means for introducing the fine mist comprises a cooling air supply line, a fog generator disposed in a bypass conduit in the cooling air supply line.

5. A glass molding machine as claimed in claim 2 including clamp connecting the plunger and the adaptor, said clamp having a conduit therein for connecting the lubricant to the outer surface of the clamp.

6. A glass molding machine comprising the combination of a molding plunger having a cavity therein, a mounting for said plunger, spray means within the plunger cavity, means for producing a fine mist of oil and water particles, means for introducing said fine mist along with cooling air into the plunger cavity through said spray means to cool the plunger, said plunger mounting comprising a drive rod and a clamp connecting said plunger and said rod, and said clamp having conduits therein in communication with the interior of said plunger and positioned for directing said mist onto an outer surface of said clamp.

7. In a glass forming machine having a glass shaping plunger including a plunger support and a plunger cooling system including air conduits positioned for directing air against a surface of the plunger the improvement which comprises means for producing a mist of both lubricant and water particles, means for introducing said mist into the air passing through said conduits, and additional conduits in said plunger for directing said mist against surfaces of the plunger support.

8. In the method of cooling and lubricating a press mold plunger including the plunger drive rod guiding surfaces in a glass molding machine having cooling air passing through the plunger interior and out along the inner drive rod guiding surfaces the improvement which comprises the step of introducing a fine mist of both oil and water into the cooling air.

References Cited

UNITED STATES PATENTS

| | | | |
|---|---|---|---|
| 1,228,862 | 6/1917 | Wight | 184—56 |
| 1,326,886 | 12/1919 | Wineman | 184—56 |
| 1,353,081 | 9/1920 | Stack | 184—56 |
| 1,217,635 | 2/1917 | Rankin | 65—170 XR |
| 1,439,372 | 12/1922 | Lott | 65—170 XR |
| 1,760,255 | 5/1930 | Peiler | 65—170 |
| 2,882,647 | 4/1959 | Tallent. | |
| 3,224,860 | 12/1965 | Stinnes. | |
| 3,285,728 | 11/1966 | Torok | 65—162 |

FRED C. MATTERN, Jr., Primary Examiner

M. A. ANTONAKAS, Assistant Examiner

U.S. Cl. X.R.

65—170; 184—1